United States Patent [19]
Nakamura

[11] Patent Number: 5,400,515
[45] Date of Patent: Mar. 28, 1995

[54] WATER-PROOF STRUCTURE FOR MEASURING APPARATUS

[75] Inventor: Kyoji Nakamura, Yokosuka, Japan

[73] Assignee: Nikon Corporation, Tokyo, Japan

[21] Appl. No.: 270,318

[22] Filed: Jul. 5, 1994

Related U.S. Application Data

[63] Continuation of Ser. No. 26,578, Mar. 5, 1993, abandoned.

[30] Foreign Application Priority Data

Mar. 10, 1992 [JP] Japan .................................. 4-086094

[51] Int. Cl.6 .................................................. G01C 1/00
[52] U.S. Cl. ........................................ 33/292; 33/299; 33/705
[58] Field of Search ................. 33/292, 290, 242, 268, 33/299, 705, 703; 277/178, 12, 215

[56] References Cited

U.S. PATENT DOCUMENTS

| 2,602,229 | 7/1952 | Larsen et al. | 33/299 |
| 3,584,889 | 6/1971 | Sheets | 277/208 |
| 4,281,463 | 8/1981 | Kobayashi et al. | 33/292 |
| 4,805,919 | 2/1989 | Wiblyi et al. | 277/215 |
| 5,056,801 | 10/1991 | Beadle | 277/178 |
| 5,224,762 | 7/1993 | Levenstein | 277/178 |

FOREIGN PATENT DOCUMENTS 2-97612  8/1990  Japan .

Primary Examiner—Christopher Fulton
Attorney, Agent, or Firm—Shapiro and Shapiro

[57] ABSTRACT

A measuring apparatus having a high water-proof property has water-proof rings rotatably disposed about outer peripheries of a horizontal shaft and a vertical shaft bearing. Gaps between the rings and the peripheries of corresponding openings in a housing are blocked by respective deformable elastic water-proof members which secure the rings to the housing.

13 Claims, 7 Drawing Sheets

WATER-PROOF STRUCTURE FOR MEASURING APPARATUS

This is a continuation of application Ser. No. 08/026,578, filed Mar. 5, 1993, now abandoned.

BACKGROUND OF THE INVENTION

1. Field of the Invention

The present invention relates to a measuring apparatus, and more particularly to a measuring apparatus having a water-proof structure.

2. Related Background Art

Measuring apparatus such as a level, a transit or a theodolite has been known. Each of those apparatus has a base and a housing rotatable about a vertical axis on the base. The transit and the theodolite also have a telescope rotatable about a horizontal axis to permit measurement of an angle in a vertical plane.

A first prior art measuring apparatus has a construction as shown in FIG. 8.

Horizontal shafts 103 and 104 are formed on the opposite side of a telescope 102. The horizontal shafts 103 and 104 are rotatably supported by a pair of bearings 105 and 106 which are fixed to a housing 101 of the measuring apparatus. Thus, the telescope 102 has an optical axis thereof (which is normal to a plane of the drawing) rotatably supported to allow alteration in a vertical plane.

A pair of grooves 102c are formed in the telescope 102 along outer peripheries of the horizontal shafts 103 and 104, and a water-proof cover 125 is attached to the housing 101. The water-proof cover 125 is formed in a ring shape to surround the horizontal shafts 103 and 104, and has a projection 125a on an inner peripheral surface. The projection 125a fits into the grooves 102c. The measuring apparatus has gaps a and b to assure stable rotation of the telescope 102. The gap a is formed between the horizontal shaft bearings 105 and 106, and the horizontal shafts 103 and 104, and the gap b is formed between the projection 125a and the groove 102c.

A vertical shaft 113 is fixed to the bottom of the housing 101, a base holder 115 is provided in the base 124, and a bearing 114 is fixed to the base holder 115 to extend upward at a center. Accordingly, the vertical shaft 113 is rotatably supported by the bearing 114.

A water-proof cover 126 is fixed to the base holder 115 at an outer periphery near the center, and a groove 126a is formed in the water-proof cover 126. A projection 101c is formed around an opening at the bottom of the housing 101, and the projection 101c fits into the groove 126a. A gap c is formed between the groove 126a and the projection 101c to assure stable rotation of the housing 101.

In the prior art measuring apparatus, predetermined lengths of the gaps a, b and c are required in order to assure the stable rotation of the rotating mechanisms. Since the gaps are very small, the water-proof and dust-proof effect is not affected by ordinary wind and rain, but it is impossible to prevent the penetration of water and dust during a rain or wind.

A measuring apparatus shown in Japanese Laid-Open Utility Model Application No. 2-97612 is provided with a disk-shaped water-proof member as a water-proof device for a rotating mechanism of a housing of a main unit.

As shown in FIGS. 9 and 10, the measuring apparatus comprises a fixed member 55, a rotating member 52 and a clamping ring 58. The fixed member 55 is a base holder which is fixed to a base 124. The rotating member 52 corresponds to the housing 101 of FIG. 8, and it rotates at the top of the fixed member 55 around the vertical shaft 51. The clamping ring 58 rotatably fits to the fixed member 55, has the same center of rotation as that of the rotating member 52 and is rotatable relative to the fixed member 55. A projection is formed on an outer periphery of the clamping ring 58.

Continuous abutments 52a and 58a are formed on the rotating member 52 and the clamping ring 58 to face each other. A disk-shaped water-proof member 60 is arranged relative to the continuous abutments 52a and 58a so that it abuts against both or secures one of them and abuts against the other.

The disk-shaped water-proof member of the water-proof device described above has an effect of sufficiently protecting an electronic circuit in the housing in spite of a simple plate-like structure. However, there is a risk of creation of a gap between the abutments 52a and 58a, and the water-proof member 60 due to a manufacturing tolerance.

SUMMARY OF THE INVENTION

It is an object of the present invention to provide a measuring apparatus having a high water-proof effect.

It is another object of the present invention to provide a water-proof device which does not deteriorate a rotation precision of a rotating shaft of a measuring apparatus.

The water-proof device of the present invention is provided around a vertical shaft and/or a horizontal shaft of the measuring apparatus.

The water-proof device of the present invention comprises a pair of ring members and a pair of ring elastic members for a horizontal shaft member of a telescope. The pair of ring members are rotatable relative to the pair of horizontal shaft members and arranged around the pair of horizontal shaft members. Each of the pair of ring elastic members comprises an outer periphery fixed to the housing around an opening and an inner periphery fixed to the pair of rings.

The measuring apparatus of the present invention comprises a ring elastic member for a vertical shaft member. The ring member rotatably fits on the vertical bearing. The ring elastic member is arranged around the vertical bearing, and includes an outer periphery fixed to an opening of the housing and an inner periphery fixed to the ring member.

In the present measuring apparatus, the ring elastic member is elastically deformed so that the rotating shaft member can smoothly rotate relative to the bearing and the member which fixes the bearing. In the present measuring apparatus, the ring member tightly abuts against the rotating shaft member to reliably prevent water from penetrating into the housing.

DETAILED DESCRIPTION OF THE PREFERRED EMBODIMENTS

An embodiment of the present invention is explained with reference to FIGS. 1 to 7.

A housing 1 of a main unit and a telescope are first explained.

Figure 1:
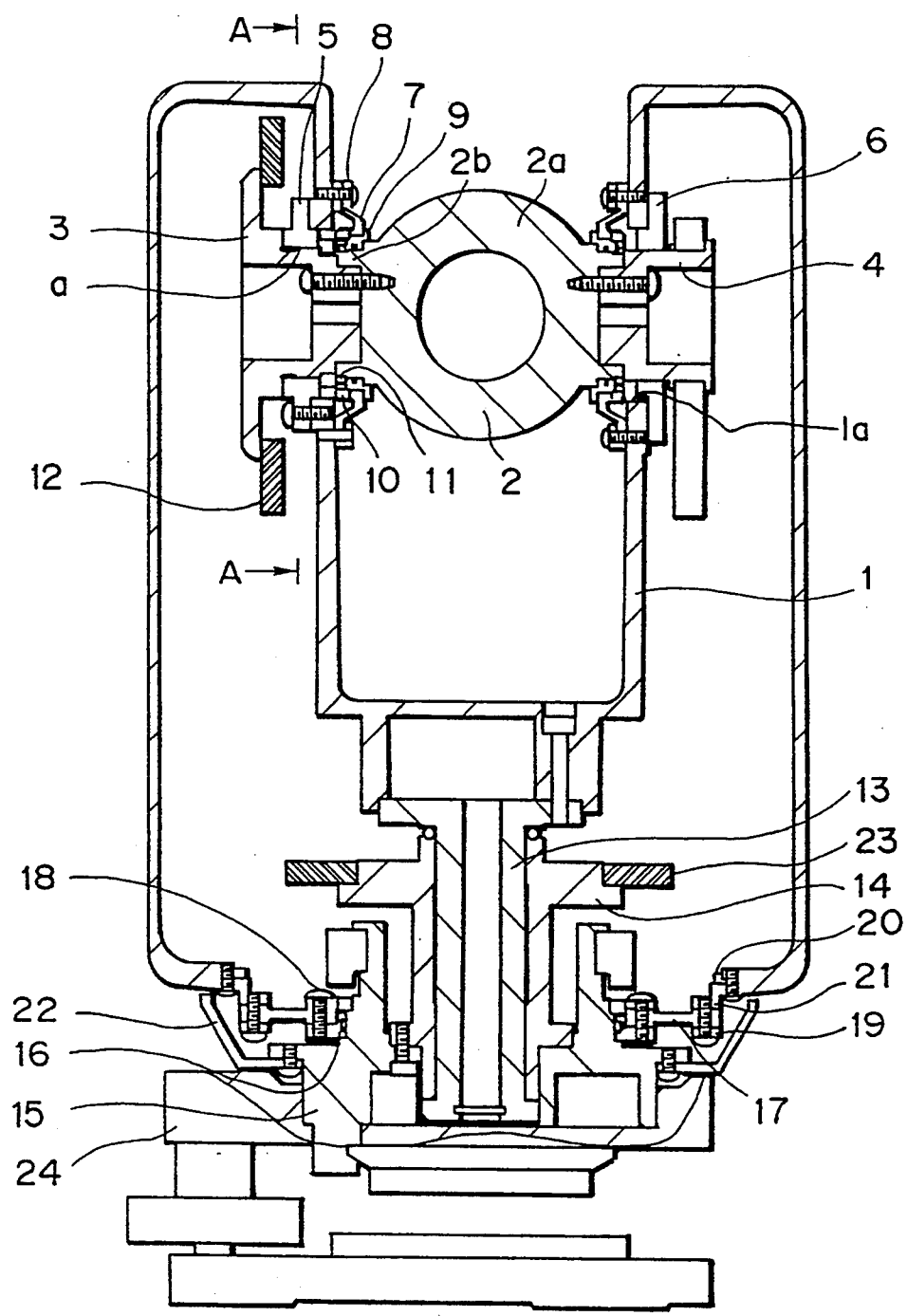
FIG. 1 shows a sectional view of an embodiment of the present invention.
Figure 3:
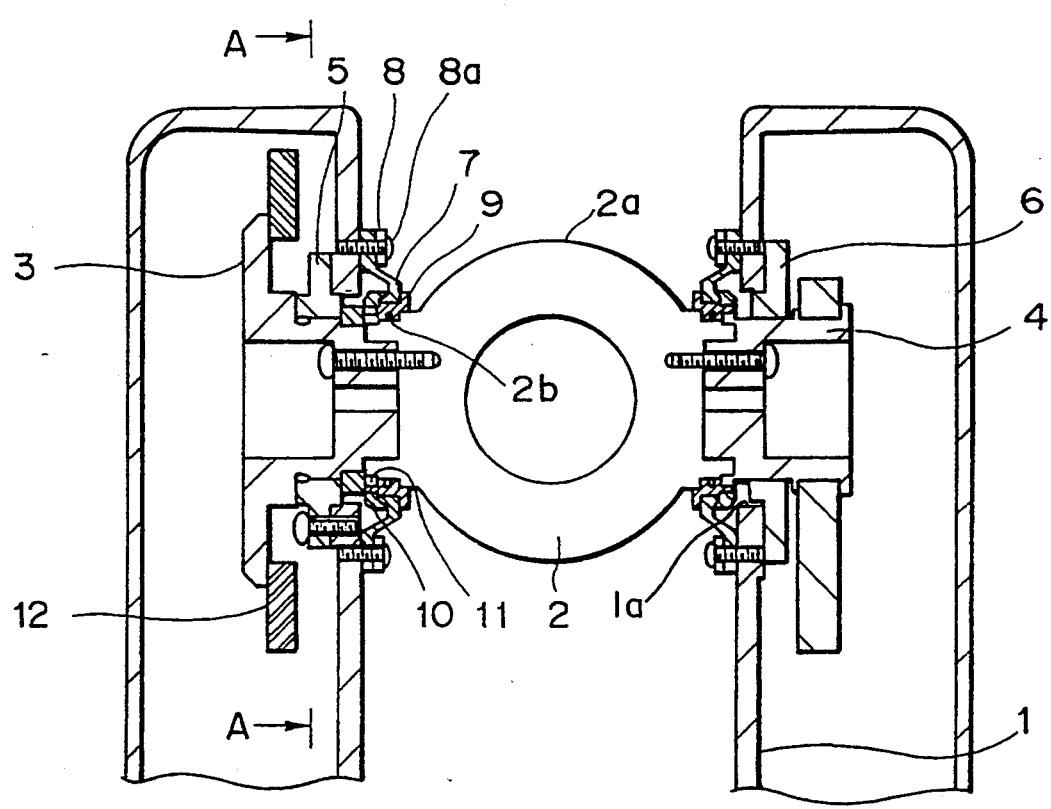
FIG. 3 shows a partial enlarged sectional view to show a relation between a main unit and a telescope of FIG. 1.

As shown in FIGS. 1 and 3, a pair of openings 1a are formed in the housing 1 to face each other, and a pair of horizontal shaft bearings 5 and 6 are fixed around the pair of openings 1a. A pair of abutments 2b are formed on the opposite sides (laterally in the drawing) of a tube 2a of the telescope 2, and a pair of horizontal shaft members 3 and 4 are fixed to the pair of abutments 2b. The pair of horizontal shaft members 3 and 4 extend through the associated openings 1a and are rotatably pivoted to the pair of horizontal shaft bearings 5 and 6. A vertical scale plate 12 for reading a vertical angle of the telescope 2 is fixed to the horizontal shaft member 3.

Figure 2:
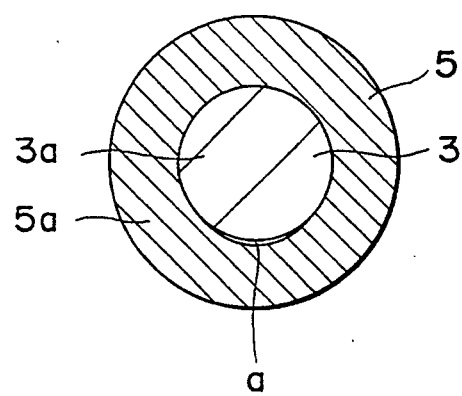
FIG. 2 shows a sectional view taken along a line A—A of FIG. 1.

The horizontal shaft member 3 and the horizontal shaft bearing 5 do not contact in their entirety but, as shown in FIG. 2, portion 3a of the horizontal shaft member 3 and portion 5a of the horizontal shaft bearing 5 contact, and there is a gap a therebetween. There is also a similar gap a between the horizontal shaft member 4 and the horizontal shaft bearing 6.

Figure 5:
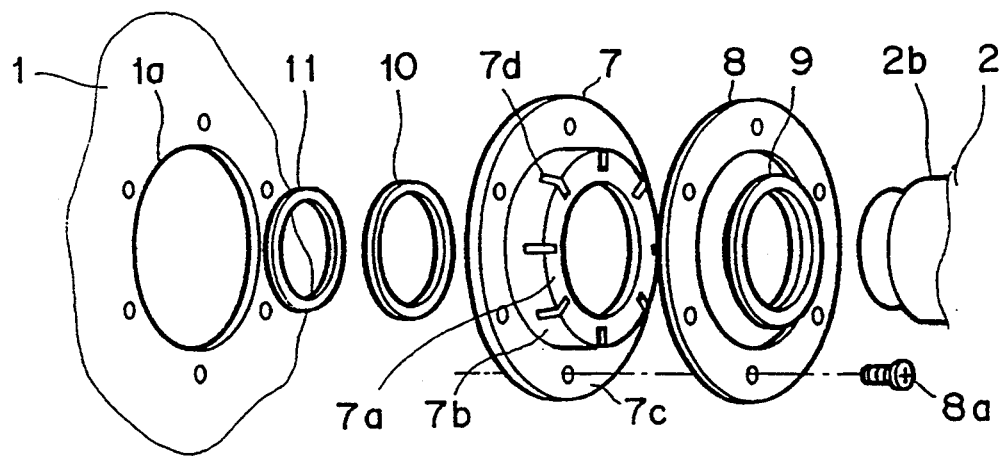
FIG. 5 shows a perspective developed assembling view of an abutment portion of a horizontal shaft and a horizontal shaft bearing.
Figure 6A:
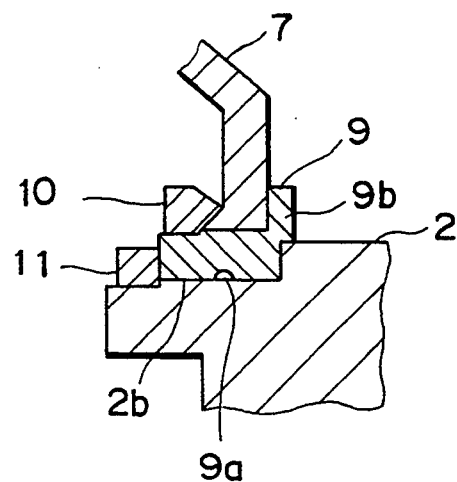
FIG. 6A shows a sectional view of a ring member abutment portion around the horizontal axis.

Referring to FIGS. 3, 5 and 6A, a water-proof structure of the opening 1a of the housing 1 is explained. FIGS. 5 and 6A show details of the horizontal shaft member 3. Since the horizontal shaft member 4 has the same structure except for reversing the left and the right directions, only the horizontal shaft member 3 is explained.

As shown in FIG. 6A, a pair of ring members 9 are rotatably abutted to an outer periphery of the abutment 2b of the telescope 2. A groove 9a and a projection 9b are formed in the ring member 9. The groove 9a is formed in a ring shape in an inner periphery of the ring member 9 and oil is filled in the groove 9a to form an oil sink. Accordingly, the areas between the pair of ring members 9 and the horizontal shaft members 3 and 4 are of a water-proof structure.

The projection 9b is formed in a ring shape in an edge of an outer periphery of the ring member 9, and a retainer ring 10 abuts against the outer periphery of the ring member 9. A water-proof member 7 has an edge of an inner periphery thereof held between the projection 9b of the ring member 9 and the retainer ring 10. Accordingly, the water-proof member 7 is uniformly pressed by the projection 9b to form the water-proof structure between the water-proof member 7 and the ring member 9.

The water-proof member 7 is an elastic member made of silicone rubber, and it comprises three parts; an inner periphery 7a, a center 7b and an outer periphery 7c, as shown in FIG. 5. The inner periphery 7a and the outer periphery 7c are of disk shape and arranged on the same axis as that of the horizontal shaft member and in different planes orthogonal to that axis. The center 7b connects the inner periphery 7a to the outer periphery 7c. Thus, the shape of the water-proof member 7 is a stepped doughnut.

The inner periphery 7a of the water-proof member 7 is fixed to the ring member 9, and the outer periphery 7c of the water-proof member 7 is held between the edge of the housing 1 around the opening 1a and the plate 8 and fixed by screws 8a. Accordingly, the area between the water-proof member 7 and the housing 1 is of water-proof structure.

The inner periphery 7a and the outer periphery 7c of the water-proof member 7 have thickness of 2.0 mm and are somewhat rigid, but the center 7b has thickness of only 0.5 mm and is deformable. There is a step between the inner periphery 7a and the outer periphery 7c, which are coupled by the center 7b. A plurality of small grooves 7d are radially formed in a region between the inner periphery 7a and the center 7b to facilitate the deformation. Accordingly, it is easy to deform. Further, since silicone rubber is very durable, it is not damaged or broken.

Figure 4:
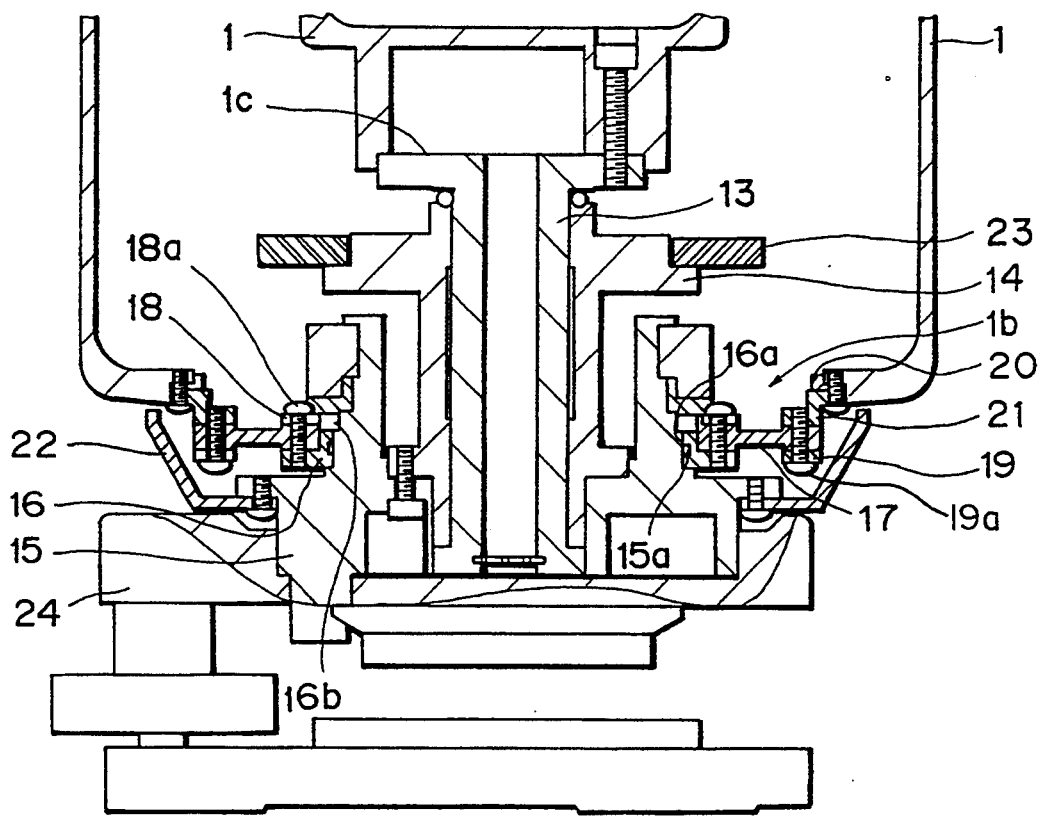
FIG. 4 shows a partial enlarged sectional view to show a relation between the main unit and a vertical shaft bearing of FIG. 1.
Figure 7:
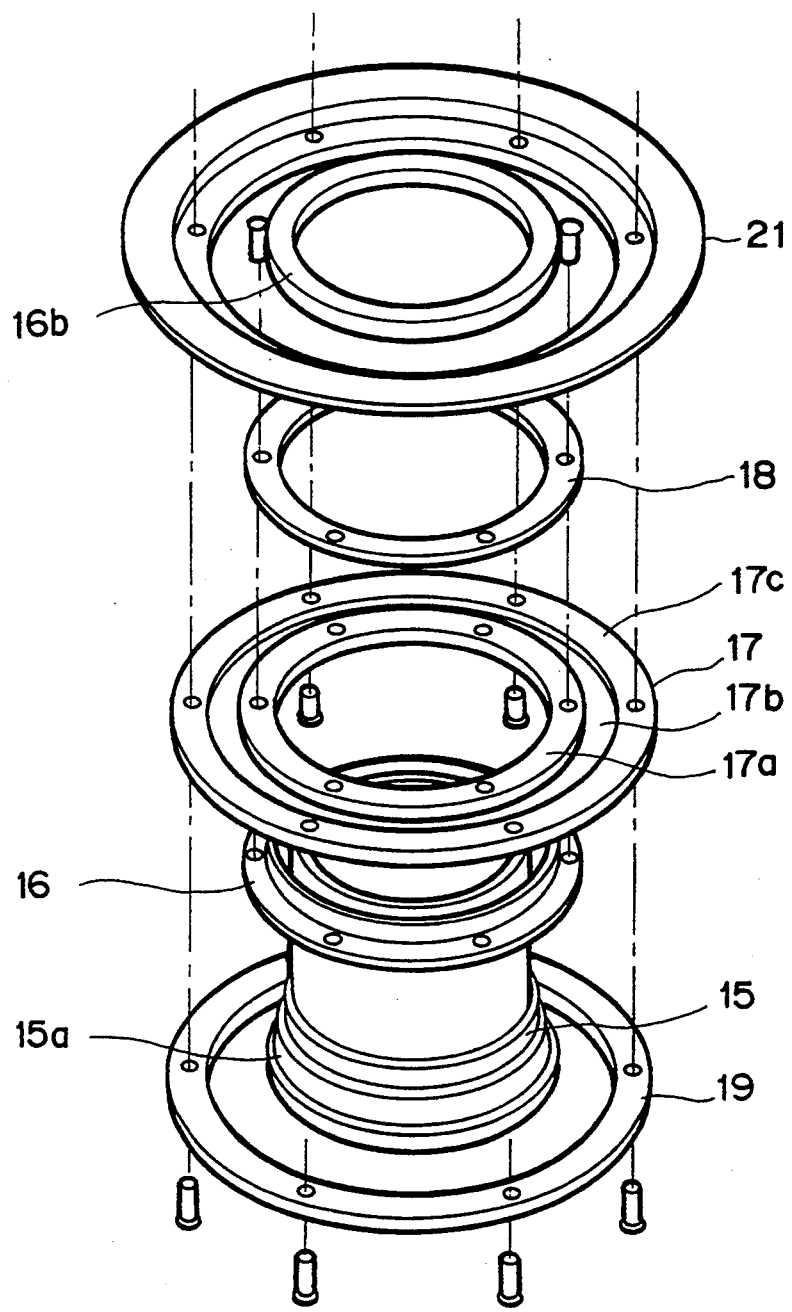
FIG. 7 shows a partial perspective developed assembling view of the main unit and the vertical shaft bearing.
Figure 8:
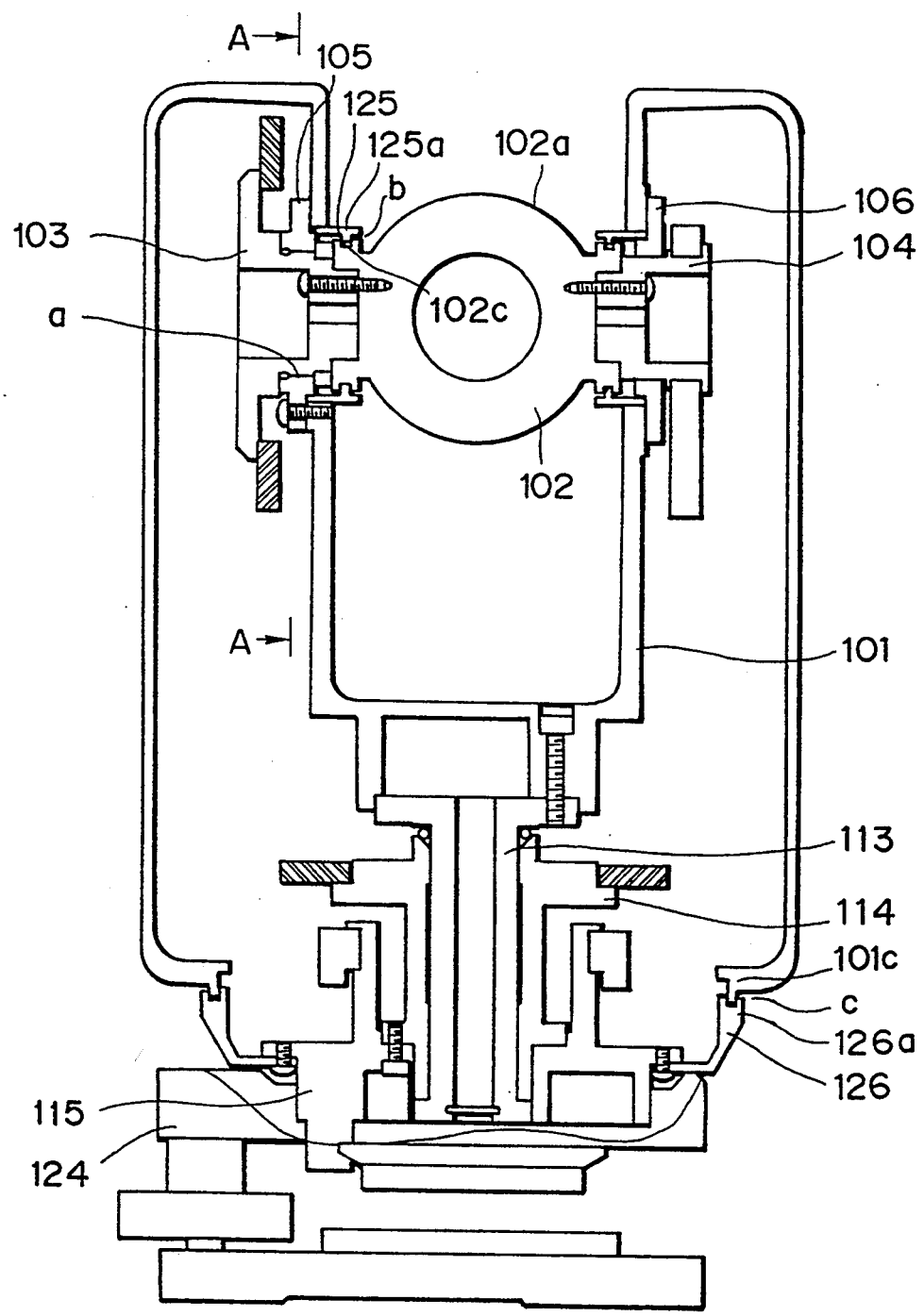
FIG. 8 shows a sectional view of a prior art measuring apparatus.
Figure 9:
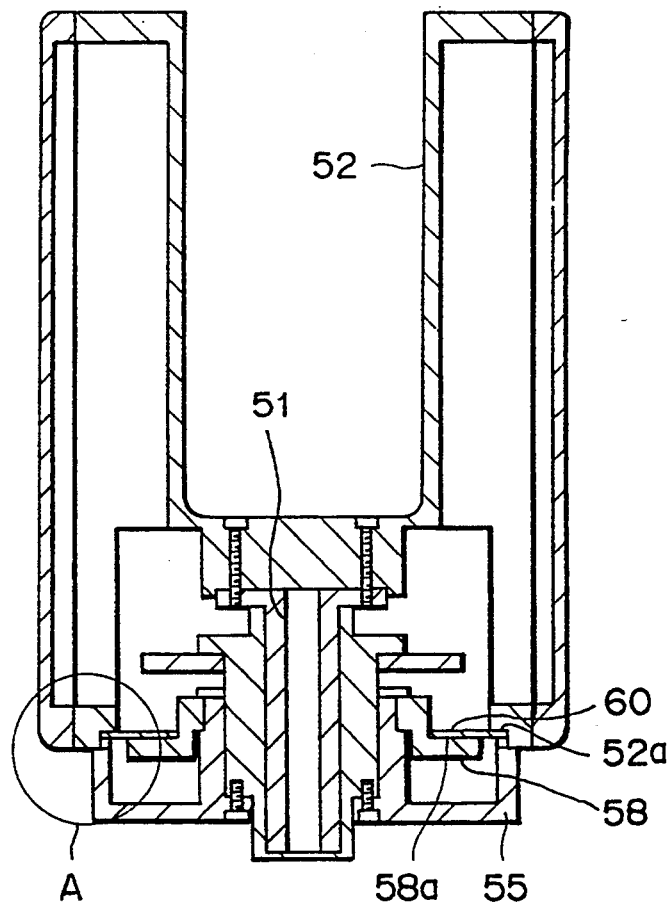
FIG. 9 shows a sectional view of another prior art measuring apparatus.
Figure 10:
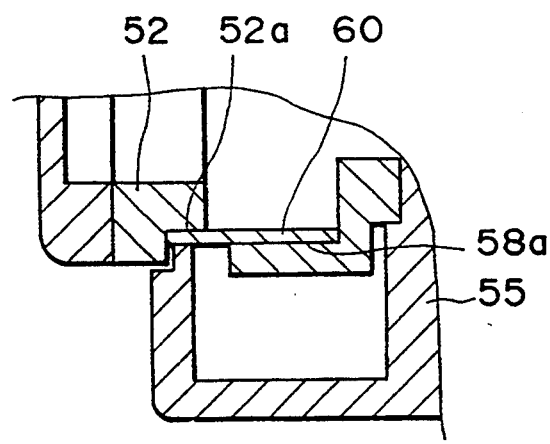
FIG. 10 shows a partial enlarged sectional view of FIG. 9.

Referring now to FIGS. 4 and 7, the housing 1 and the base 24 are explained.

As shown in FIG. 4, an opening 1b is formed at the bottom of the housing 1 and a vertical shaft 13 is arranged at the center of the opening 1b. The vertical shaft 13 has a top thereof fixed to the housing 1 and a bottom thereof extending downward from the opening of the housing 1. The vertical shaft 13 is rotatably supported by a vertical shaft bearing 14 and an oil sink is provided between the vertical shaft 13 and the vertical shaft bearing 14. A disk is provided at the top of the vertical shaft bearing 14 and a horizontal scale plate 23 is provided on the disk. The vertical shaft bearing 14 is fixed to the base holder 15 which is removably fixed to the base 24.

A connection adapter 21 is fixed to the end of the bottom of the housing 1, that is, the periphery of the opening 1b through a packing 20. The connection adapter 21 is of ring shape to encircle the opening 1b.

A mount is provided on the outer periphery of the base holder 15, and a water-proof cover 22 is provided to the mount. In the present measuring apparatus, the water-proof cover 22 and the housing 1 protect the vertical shaft 13, the vertical shaft bearing 14, the base holder 15 and the horizontal scale plate 23.

An engagement 15a is formed on the base holder 15 above the mount, and a ring member 16 rotatably fits to the outer periphery of the engagement 15a. A thrust ring 16b also fits to the engagement 15a to prevent the thrust movement of the ring member 15.

The ring member 16 has a groove 16a formed in the inner periphery thereof similar to the ring member 9 shown in FIG. 6A, and oil is filled in the groove 16a to form an oil sink. A water-proof member 17 is fixed to the outer periphery of the ring member 16. The water-proof member 17 has an inner periphery thereof held between the ring member 16 and an abutment 18 and is tightly secured by a plurality of screws 18a.

The water-proof member 17 is an elastic member made of silicone rubber similar to the water-proof member 7, shown in FIG. 5. Referring to FIG. 7, the water-proof member 17 comprises an inner periphery 17a, a center 17b and an outer periphery 17c. The inner periphery 17a and the outer periphery 17c have thickness of 2.0 mm and are somewhat rigid, but the center has thickness of only 0.5 mm and is very deformable. Since silicone rubber is very durable, it is not damaged or broken.

The outer periphery of the water-proof member 17 is held between the connection adapter 21 and an abutment 19 and tightly secured by a plurality of screws 19a. Accordingly, the opening 1b of the housing 1 has a water-proof structure. More specifically, the gaps between the vertical shaft 13 and the vertical shaft bearing 14, between the vertical shaft bearing 14 and the ring member 16, between the ring member 16 and the water-proof member 17, between the water-proof member 17 and the connection adapter 21, and between the connection adapter 21 and the main unit housing are blocked by the packing, the water-proof member or the oil sink.

As the telescope 2 is collimated, the rotating members are rotated and the water-proof is effected. This is explained below.

When a vertical force is applied to the tube 2a to align the telescope 2 to the collimation direction, the pair of horizontal shaft members 3 and 4 are rotated together with the tube 2a.

The engagement between each abutment 2b and the corresponding ring member 9 is tight, but the friction between them is small due to the function of the lubrication oil in the oil sank. The small friction between the ring member 9 and the abutment 2b tends to cause the ring member to rotate with the telescope 2. The ring member 9, however, is secured to the housing 1 by the water-proof member 7, the central portion 7b of which is deformable to some extent. Therefore, rotation of the ring member 9 is limited to the extent of deformation of the water-proof member 7, whereby the telescope 2 can rotate relative to the ring member 9. The extent of deformation is normally in a range of 0.1-0.2 mm.

The inner periphery 7a, the center 7b and the outer periphery 7c of the water-proof member 7 are integrally formed without any breaks, and the gaps between the engagement 2b and the ring member 9, between the ring member 9 and the water-proof member 7, and between the water-proof member 7 and the housing 1 are of a water-proof structure as mentioned above. Accordingly, the opening 1a of the housing 1 is of a perfect water-proof structure.

When a horizontal force is applied to the tube 2a to align the telescope to the collimation direction, the vertical shaft 13 of the housing 1 is rotated relative to the vertical shaft bearing 14 through the telescope 2.

As the housing 1 is rotated, the connection adapter 21, the water-proof member 17 and the ring member 16 rotate with the housing 1. The ring member 16 is rotatable relative to the base holder 15. However, since the ring member 16 tightly fits around the base holder 15, the friction between the ring member 16 and the base holder 15 tends to retard rotation of the ring member 16 relative to the rotation of the housing 1. Since the center 17b of the water-proof member 17 is very deformable, the water-proof ring 16 rotates relative to the housing 1 within the limit of the deformation. The range of deformation is normally 0.1-0.5 mm.

The inner periphery 17a, the center 17b and the outer periphery 17c of the water-proof member 17 are integrally formed without any breaks, and the gaps between the housing 1 and the connection adapter 21, between the connection adapter 21 and the water-proof member 17, between the water-proof member 17 and the ring member 16, between the ring member 16 and the base holder 15, between the base holder 15 and the vertical shaft bearing 14, and between the vertical shaft bearings 14 and the vertical shaft 13 are of water-proof structure as described above. Accordingly, the opening 1b has a perfectly water-proof structure.

Figure 6B:
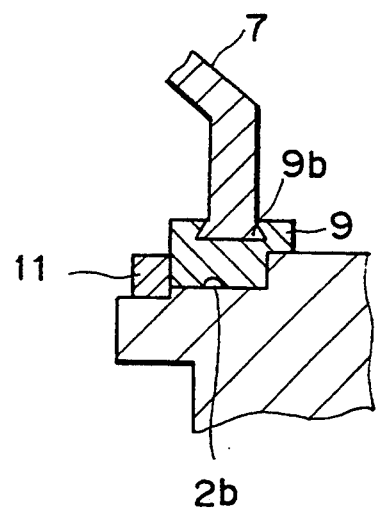
FIG. 6B shows a sectional view of a modification of the ring member abutment portion.

A modification is now explained with reference to FIG. 6B. In the present modification, the inner periphery of the water-proof member 7 is fitted to a dovetail groove 9b of the water-proof ring 9. Thus, a part corresponding to the retainer ring 10 is not necessary. Other parts are identical to those of the above embodiment and the explanation thereof is omitted.

The water-proof device shown in the above embodiment may be applied to only one of the rotating mechanism of the housing and the rotating mechanism of the telescope, or the water-proof ring and the water-proof member may be integrally formed.

The water-proof members 9 and 17 may have different hardnesses of silicone rubber from portion to portion instead of having different thicknesses between the inner periphery 7a and the outer periphery 7c, and the center 7b so that only the center 7b is deformable.

What is claimed is:

1. A measuring apparatus comprising:
   a telescope;
   a pair of horizontal shaft members fixed to said telescope to extend perpendicularly to an optical axis of said telescope;
   a housing having a pair of openings formed therein to receive said horizontal shaft members;
   a pair of bearings provided around said pair of openings for rotatably supporting said pair of horizontal shaft members;
   a pair of ring members each rotatably receiving a corresponding one of said pair of horizontal shaft members; and
   a pair of ring-shaped elastic members arranged around said pair of horizontal shaft members, each of said pair of elastic members having an outer periphery fixed to said housing around the corresponding opening and an inner periphery fixed to the corresponding ring member.

2. A measuring apparatus according to claim 1, further comprising means for preventing thrust movement of said pair of ring members.

3. A measuring apparatus according to claim 1, wherein the outer periphery and the inner periphery of each elastic member are arranged at axially different positions relative to the corresponding horizontal shaft member, and each elastic member includes a stepwise intermediate portion connecting said outer periphery to said inner periphery.

4. A measuring apparatus according to claim 1, wherein each of said pair of elastic members includes an intermediate portion connecting said outer periphery to said inner periphery, said outer periphery and said inner periphery have relatively high rigidity and said intermediate portion has relatively low rigidity.

5. A measuring apparatus according to claim 4, wherein said intermediate portion is thinner than said outer periphery and said inner periphery.

6. A measuring apparatus according to claim 1, wherein said elastic members are made of silicone rubber.

7. A measuring apparatus according to claim 1, further comprising fixing means for uniformly pressing the inner periphery of said elastic members to the corresponding ring member.

8. A measuring apparatus comprising:
a vertical shaft member;
a housing fixed to said vertical shaft member and having a circular opening centered at said vertical shaft member formed at a bottom thereof;
a vertical bearing rotatably supporting said vertical shaft member;
a ring member to rotatably receiving to said vertical bearing; and
a ring-shaped elastic member arranged around said vertical shaft;
said elastic member including an outer periphery fixed to said housing around said opening and an inner periphery fixed to said ring member.

9. A measuring apparatus according to claim 8, further comprising means for preventing thrust movement of said ring member.

10. A measuring apparatus according to claim 8, wherein said elastic member is made of silicone rubber.

11. A measuring apparatus according to claim 8, further comprising fixing means for uniformly pressing the inner periphery of said elastic member to said ring member.

12. A measuring apparatus according to claim 8, wherein said elastic member includes an intermediate portion connecting said outer periphery to said inner periphery, said outer periphery and said inner periphery have relatively high rigidity and said intermediate portion has relatively low rigidity.

13. A measuring apparatus according to claim 12, wherein said intermediate portion is thinner than said outer periphery and said inner periphery.

* * * * *